US010594940B1

(12) United States Patent
Persiantsev

(10) Patent No.: US 10,594,940 B1
(45) Date of Patent: Mar. 17, 2020

(54) REDUCTION OF TEMPORAL AND SPATIAL JITTER IN HIGH-PRECISION MOTION QUANTIFICATION SYSTEMS

(71) Applicant: Vulcan Inc., Seattle, WA (US)

(72) Inventor: Michael Persiantsev, Shrewsbury, MA (US)

(73) Assignee: Vulcan Inc., Seattle, WA (US)

(*) Notice: Subject to any disclaimer, the term of this patent is extended or adjusted under 35 U.S.C. 154(b) by 0 days.

(21) Appl. No.: 15/870,678

(22) Filed: Jan. 12, 2018

(51) Int. Cl.
H04N 5/232 (2006.01)
G01B 11/26 (2006.01)

(52) U.S. Cl.
CPC ......... H04N 5/23267 (2013.01); G01B 11/26 (2013.01)

(58) Field of Classification Search
CPC ........... H04N 5/23261; H04N 5/23267; G01B 11/26; G06K 9/00624; G06K 9/00751; G06T 2207/20201
See application file for complete search history.

(56) References Cited

U.S. PATENT DOCUMENTS

| 6,424,370 | B1 * | 7/2002 | Courtney | G06K 9/00342 348/143 |
| 8,103,116 | B1 * | 1/2012 | Simonson | H04N 5/23264 382/236 |
| 8,175,147 | B1 * | 5/2012 | Webb | H04N 19/197 348/497 |
| 8,284,266 | B2 * | 10/2012 | Deng | H04N 5/23248 348/208.1 |
| 8,335,345 | B2 * | 12/2012 | White | A63B 24/0003 382/103 |
| 8,896,713 | B2 * | 11/2014 | Corey | H04N 5/23254 348/208.12 |
| 9,020,261 | B2 * | 4/2015 | Lipton | G06K 9/00771 382/173 |
| 9,068,831 | B2 * | 6/2015 | Monobe | H04N 5/23254 |
| 9,378,632 | B2 * | 6/2016 | Venetianer | G06K 9/00771 |
| 9,413,963 | B2 * | 8/2016 | Beysserie | H04N 5/23254 |
| 9,554,046 | B2 * | 1/2017 | Ardo | H04N 5/2327 |
| 9,697,587 | B2 * | 7/2017 | Yuan | H04N 5/23267 |
| 9,721,172 | B2 * | 8/2017 | Wright | G06K 9/00825 |
| 9,892,606 | B2 * | 2/2018 | Venetianer | G06K 9/00771 |
| 9,904,853 | B2 * | 2/2018 | Hsu | G06K 9/6202 |
| 10,024,965 | B2 * | 7/2018 | Nehmadi | G01S 17/08 |
| 2004/0181747 | A1 * | 9/2004 | Hull | G06F 3/1204 715/202 |
| 2006/0132487 | A1 * | 6/2006 | Sada | G06T 7/20 345/427 |

(Continued)

Primary Examiner — Brian P Yenke
(74) Attorney, Agent, or Firm — Davis Wright Tremaine LLP

(57) ABSTRACT

A first image and a second image recorded during a video capture event is obtained. A correction factor is computed based at least in part on a target interval and an interval of time between recording the first image and recording the second image. A motion value is computed based at least in part on a difference between the first region and the second region, with the first region and the second region both containing a reference object present in the first image and the second image. A normalized motion value is provided based at least in part on normalizing the motion value according to the correction factor.

20 Claims, 7 Drawing Sheets

(56) References Cited

U.S. PATENT DOCUMENTS

| | | | | |
|---|---|---|---|---|
| 2009/0219401 | A1* | 9/2009 | Drouot | H04N 5/23254 |
| | | | | 348/208.4 |
| 2011/0090344 | A1* | 4/2011 | Gefen | H04N 5/232 |
| | | | | 348/169 |
| 2011/0249029 | A1* | 10/2011 | Baumgart | G06T 3/0068 |
| | | | | 345/648 |
| 2012/0002112 | A1* | 1/2012 | Huang | H04N 5/144 |
| | | | | 348/579 |
| 2012/0020524 | A1* | 1/2012 | Ishikawa | H04N 7/183 |
| | | | | 382/103 |
| 2012/0275511 | A1* | 11/2012 | Shemer | H04N 19/139 |
| | | | | 375/240.02 |
| 2015/0103145 | A1* | 4/2015 | Sakata | H04N 5/23229 |
| | | | | 348/46 |
| 2016/0140695 | A1* | 5/2016 | Yuan | H04N 5/23267 |
| | | | | 382/103 |
| 2016/0292905 | A1* | 10/2016 | Nehmadi | G01S 17/08 |
| 2016/0360148 | A1* | 12/2016 | Mahapatro | H04N 7/0127 |
| 2017/0084045 | A1* | 3/2017 | Hsu | G06K 9/6202 |
| 2017/0278219 | A1* | 9/2017 | Yuan | H04N 21/44218 |
| 2018/0041716 | A1* | 2/2018 | Kajimura | G06T 5/003 |
| 2018/0098083 | A1* | 4/2018 | McAllister | H04N 19/172 |
| 2019/0089923 | A1* | 3/2019 | Katano | H04N 5/44504 |

\* cited by examiner

REDUCTION OF TEMPORAL AND SPATIAL JITTER IN HIGH-PRECISION MOTION QUANTIFICATION SYSTEMS

BACKGROUND

Digital video is captured as a contiguous sequence of still image frames. Accurately measuring the amount of motion occurring between the still image frames can be difficult due to temporal and spatial wobble. For example, an almost imperceptible change in the angle of a camera between image frames can cause significant length of displacement of a distant object captured in the image frames, making it difficult to distinguish how much of the displacement was due to camera motion and how much was due to motion of the object itself. Likewise, hardware and software limitations of digital video recorders can cause the timing between captures of the image frames to be inconsistent. These inaccuracies and inconsistencies result in imprecise calculations of object motion.

BRIEF DESCRIPTION OF THE DRAWINGS

Various techniques will be described with reference to the drawings, in which.

DETAILED DESCRIPTION

Techniques and systems described below relate to normalizing temporal and spatial jitter for kinematic motion analysis systems. In one example, a target frame interval is determined, whereby the target frame interval specifies a model duration of time between capturing a first image frame and a second image frame. In this example, the second image frame is adjacent to the first image frame in a contiguous sequence of image frames. In the example, an actual interval of time between capture of the first image frame and capture of the second image frame is determined, and a static feature common to both the first image frame and the second image frame is registered. Further in this example, an occurrence of the static feature in the first image frame and another occurrence of the static feature in the second image frame is identified and a spatial distance between a first set of pixels in the first image frame and second set of pixels in the second image frame is computed by aligning the occurrence of the static feature in the first image frame with the other occurrence of the static feature in the second image frame. Finally, a normalized motion value is computed based on the spatial distance, the actual interval of time, and the target frame interval, and an action is performed based on the normalized motion value reaching a value relative to a threshold.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of motion detection and analysis, by normalizing spatial and temporal jitter of a video recording device that is recording objects in motion. Additionally, techniques described and suggested in the present disclosure improve the efficiency and accuracy of motion detection systems by normalizing and filtering out camera movement and errors due to variations in frame rate. Moreover, techniques described and suggested in the present disclosure are necessarily rooted in computer technology in order to overcome problems specifically arising with media write latency and other causes of variations in frame recording time by normalizing temporal differences between frames.

Figure 1:
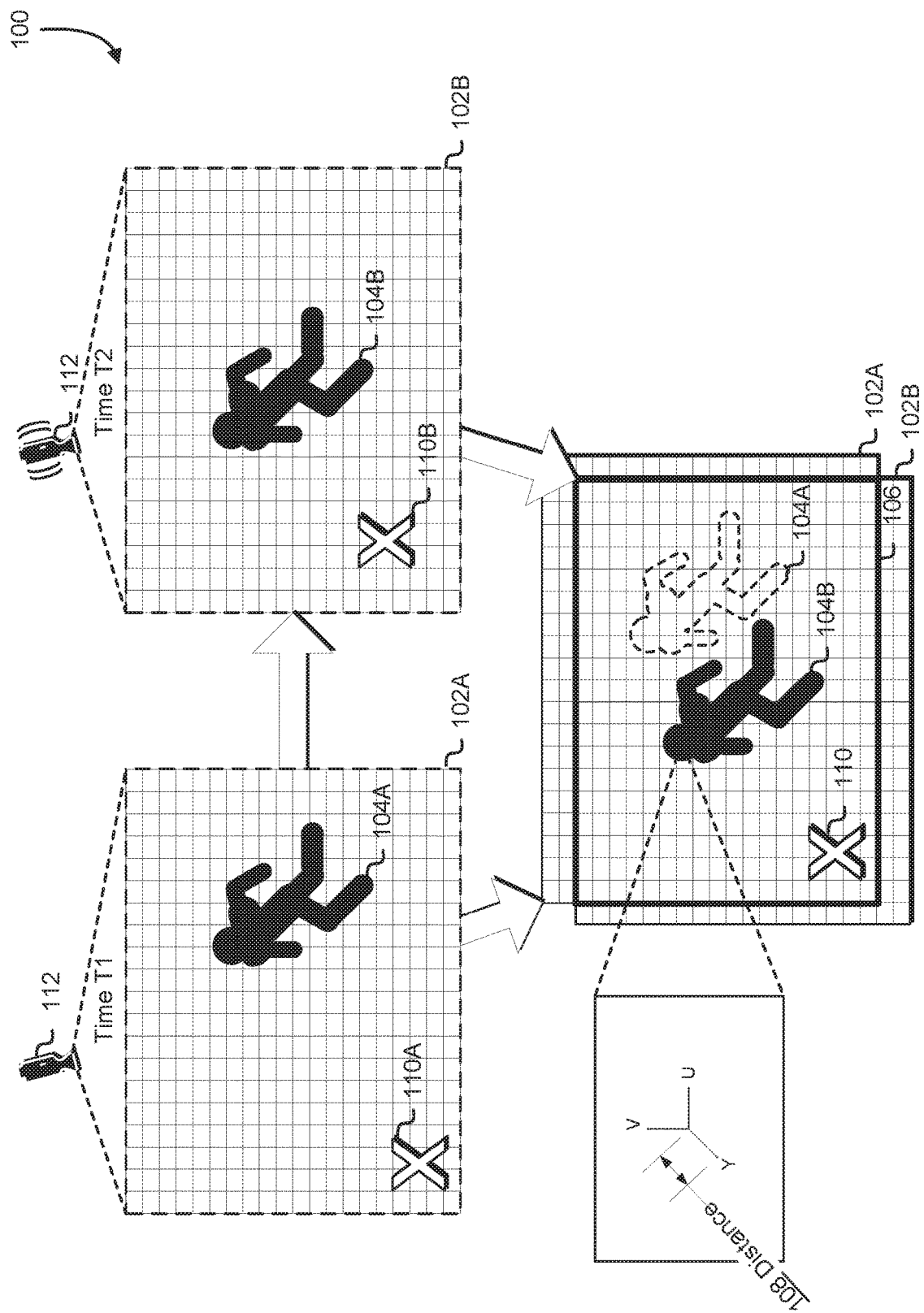
FIG. 1 illustrates an example of reducing spatial jitter between image frames in accordance with an embodiment.

FIG. 1 illustrates an example 100 of an embodiment of the present disclosure. Specifically, FIG. 1 depicts a pair of image frames 102A-02B of a contiguous sequence of image frames from a video capture event recorded by a video capture device 112. In an embodiment, a video capture event is comprised of a sequence of static frames, each captured at short intervals apart. The video capture event illustrated in FIG. 1 has recorded a scene containing an object in motion between times T1 and T2. The scene is captured in the image frames as digital objects 104A-04B. In addition, a static feature 110 is identified in the image frames 102A-02B. The static feature 110 may be usable to align the pair of image frames 102A-02B in order to mitigate any spatial jitter (also referred to as spatial wobble) experienced by the video capture device 112 between the image captures.

In order to use the video capture event to study the motion of objects (kinematics) captured within the static frames to a high degree of precision, the velocity of the objects within the frames that were in motion during the video capture event should be accurately calculated. In embodiments, the static features 110 of each of the pair of image frames 102A-02 is aligned and a common region 106 to each of the pair of image frames 114 is identified. By aligning the images frames 102A-02B before determining the distance 108 between the digital objects 104B, the effects of spatial jitter by the video capture device 112 can be reduced, thereby allowing for a more accurate calculation of the distance 108 between the digital objects 104A-04B. In this manner, the velocity of the object between times T1 and T2 can be more accurately calculated based on the distance 108.

The pair of image frames 102A-02B may be individual frames from an image capture event. The first image frame 102A may be captured by the video capture device 112 at a first time (T1), whereas the second image frame 102B may be captured by the video capture device 112 at a second time (T2) during where the video capture device 112 wobbled between time T1 and T2. During an image capture event, a video capture device, such as a digital video camera, may experience near imperceptible camera wobble due to a variety of factors, such as wind, vibrations due to excited stomping of a stadium crowd, and so on. This camera wobble may cause the pixels from frame to frame to become misaligned, and this effect can become more pronounced the farther the camera is from the objects being captured in an image. Thus, even miniscule movements of the video capture device 112 can cause inaccuracies in calculating an amount of motion between frames because the pixels between the two images may no longer be aligned. That is, if the camera moves, it may appear to the system performing motion analysis that the entire background moved. Thus, techniques of the present disclosure make it possible for the system to reduce the differences between two successive image frames caused by camera motion.

The digital objects 104A-04B may be a set of pixel values representing an object in a scene that was captured in a digital image. As pictured in the example 100, the digital objects 104A-04B represent a figure that is running in the scene. The static feature 110 may be an object, pattern, texture, or some otherwise recognizable visual characteristic in the scene that is understood to be stationary throughout at least the portion of the video capture event in which normalization of spatial jitter is performed as described in the present disclosure. Examples of the static feature may be goal posts on a sports field, a corner of a building, a stationary logo, etc. There may be more than one static feature designated in the scene. However, ideally each static feature is distinguishable (e.g., by a computing device using edge and pattern detection) from image frame to image frame; e.g., an occurrence of the static feature should not appear more than once in a given image frame.

As can be seen between the image frames, the static feature 110B appears higher and farther to the right in the second image frame 102B than does the static feature 110A in the first image frame 102A. Because the static feature 110 is understood to be stationary, this displacement between the first image frame 102A and the second image frame 102B may have been caused by spatial jitter of the video capture device 112 between time T1 and time T2. By aligning the static feature 110 in both image frames 102A-02B, the spatial jitter may be neutralized.

The common region 106 may be a region of pixels that represent the same portion of the scene between both image frames. In order to normalize the spatial jitter of the video capture device 112, the image frames 102A-02B are aligned to a static feature 110 that is common to both image frames. Thus, as can be seen, after the static features 110A-10B are aligned, pixels on the bottom and left side of the second image frame 102B are of a region shared by the first image frame 102A; likewise, pixels on the top and right of the first image frame 102A are not of a region in common with the second image frame 102B. Thus, the common region 106 includes the area of the scene that both image frames 102A-02B have in common.

The distance 108 in the example 100 is shown to be a distance in a color space 130 rather than a distance in position. For example, the image frames 102A-02B may be aligned and a color space difference may be determined between corresponding pixels in the common region 106 of each image frame. In other words, given the common region 106 determined, pixel (0, 20) in the first image frame 102A may correspond to pixel (10, 0) in the second image frame 102B. Thus, the distance 108 may be as absolute difference between one or more components (e.g., luminance/brightness) of the color of the pixel (0, 20) in the first image frame 102A and the same one or more components of the color of the pixel (10, 0) in the second image frame 102B (e.g., $\|y_i - y_{i-1}\|$, where $y_i$ represents a luminance value of a pixel in the second image frame 102B and $y_{i-1}$ represents a luminance value of a corresponding pixel in the first image frame 102A). In such embodiments, the distance 108 may be calculated in this manner for each pixel in the common region 106. In other embodiments, the distance 108 may be the Euclidean distance between one or more components of the color space 130 (e.g., $\sqrt{\|r_i - r_{i-1}\|^2 + \|g_i - g_{i-1}\|^2 + \|b_i - b_{i-1}\|^2}$). Examples of types of color spaces include, CIE 1931 XYZ, CIELUV, CIELAB, CIEUVW, RGB, sRGB, Adobe RGB, Adobe Wide Gamut RGB, YIQ, YUV, YDbDr, YPbPr, YCbCr, ICtCp, xvYCC, HSV, HSL, CIELCh$_{ab}$ and CIELCh$_{uv}$, and CYMK. The resulting difference between the common region in the first image frame 102A and the second image frame 102B may be a set of values comprising a difference frame. In embodiments, the amount of motion between two frames may be derived from the difference frame; for example, the sum of the set of values comprising the difference frame may be considered as the amount of motion between the two frames.

In some implementations, the difference is the absolute difference between a sum of all pixel values in one frame and the sum of all pixel values in the adjacent image frame $\sqrt{\|P_i - P_{i-1}\|^2}$. In some embodiments, the distance 108 may be an x-y distance between a pixel of the digital object 104A and a corresponding pixel of the digital object 104B. For example, the distance 108 may be the Euclidean distance between a pixel on the digital object 104A and a corresponding point on the digital object 104B after the image frames 102A-02B have been aligned.

As noted above, the distance 108 may additionally or alternatively be an x-y distance between a pixel of the digital object 104A and a corresponding pixel of the digital object 104B. Thus, between time T1 and time T2, the object represented by the digital objects 104A-04B moved the distance 108. If the units of the distance 108 is pixels and the number of pixels per real world measurement of distance is known, the distance in a real-world measurement of distance can be determined based on the distance 108.

In the difference frame, the absolute difference between values of pixels corresponding to objects that are relatively stationary is low, whereas the absolute difference between values of pixels that overlap with object in motion are likely to be high. In this manner, regions within the image frames 102A-02B experiencing a lot of high velocity motion can be identified and distinguished from other areas of the image frame 102A-02B. Furthermore, a summation of the color space differences (or summation of the squares of the color space differences, for even greater contrast) of all of the pixels in the common region 106 may reflect an overall level of activity within the common region 106. In one embodiment, the level/amount of activity (motion) may be computed according to the following L2-norm (least squares) formula:

$$M = \sum_{i,j}^{N} (x_{i,j}^F - x_{ij}^{F-1})^2$$

Where M represents a level of motion as a summation performed over all pixels (N) in a common region, i and j represent coordinates of a pixel in the common region of an image frame in the sequence of image frames, F and F−1 represent current and preceding image frames in the sequence of image frames, $x_{ij}^F$ and $x_{ij}^{F-1}$ represent values (e.g., luminance/brightness values) of corresponding pixels in the common regions of the image frame and preceding image frame respectively. Thus, in this example, M is the summation of the squares of all corresponding pixel differences in the common regions of two adjacent image frames in the sequence of image frames. In another embodiment, the level/amount of activity may be an L1-norm (least absolute deviation) computation:

$$M = \sum_{i,j}^{N} |x_{ij}^{F} - x_{ij}^{F-1}|$$

The video capture device 112 may be a device for electronic motion picture acquisition. In embodiments, the video capture device 112 may include an image sensor (e.g., charge-coupled device (CCD) or complementary metal-oxide-semiconductor (CMOS)), memory, image processing capability, and/or a microphone. The video capture device 112 may be designed to record and/or communicate a digital or analog stream of media (e.g., audio, video, text, or any combination of audio, video, or text) in a manner such that the media can be replayed or reproduced on a device designed to display such media. Examples of such recording devices include a digital video camera, a web camera, mobile telephone, and so on. In embodiments, the video capture device 112 is stationary. However, it is contemplated that certain techniques of the present disclosure may be applied to non-stationary video capture devices. For example, a non-stationary video capture device may follow an object in motion, and distance traveled and/or velocity may be determined by a change in locations of stationary features shared between image frames.

Figure 2:
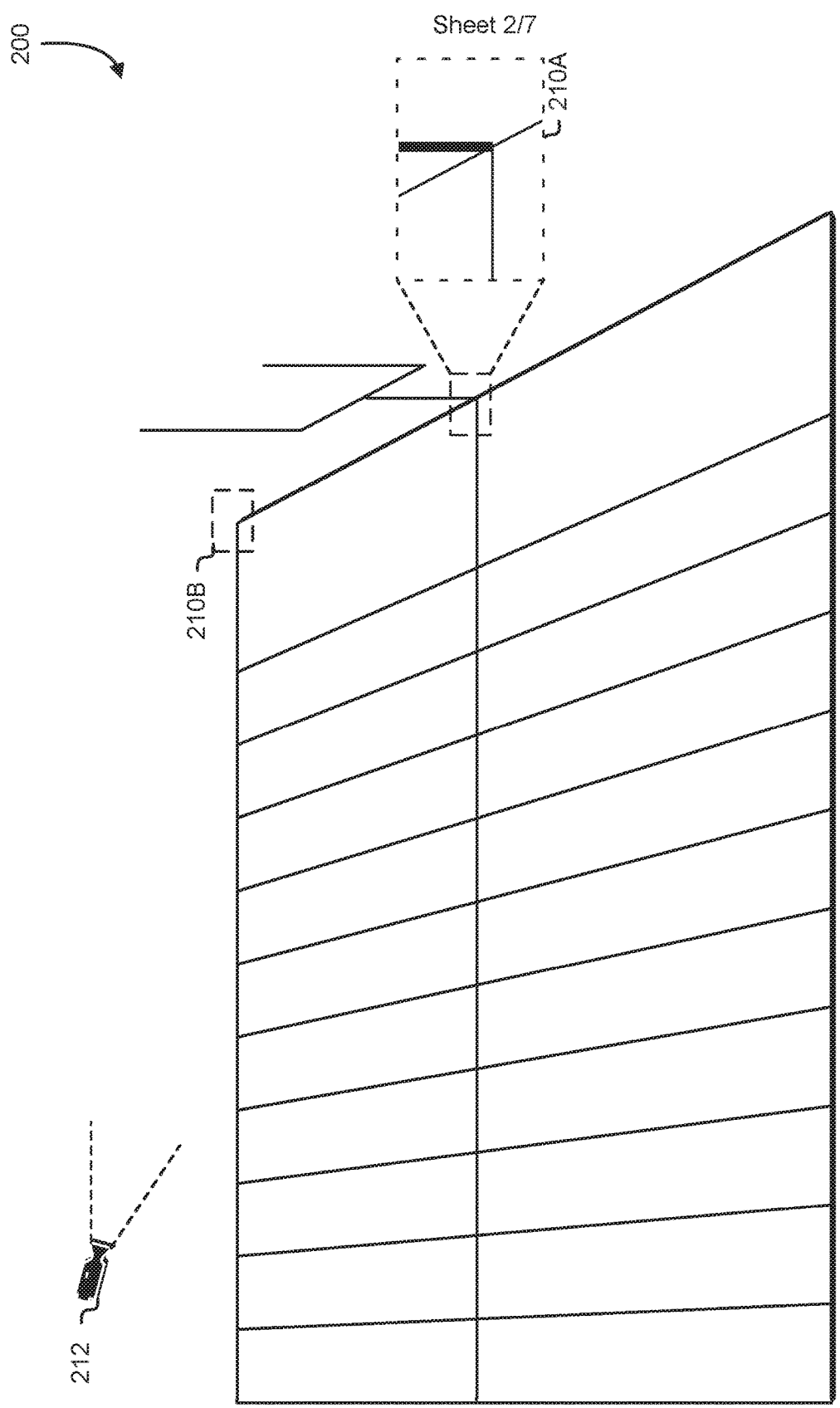
FIG. 2 illustrates an example of a static feature in accordance with an embodiment.

FIG. 2 illustrates an example 200 of an embodiment of the present disclosure. Specifically, FIG. 2 depicts static features 210A-10B similar to the static feature 110 described in FIG. 1 present in a scene recorded by a video capture device 212. The static features 210A-10B may be utilized by the system of the present disclosure to align image frames of a sequence of image frames captured by the video capture device 112 in order to reduce spatial jitter in a manner described in conjunction with FIG. 1. The video capture device 212 may be similar to the video capture device 112 described in conjunction with FIG. 1.

Each of the static features 210A-10B may be an object, pattern, texture, or some otherwise recognizable visual characteristic in the scene that acts as a spatial anchor; that is, the static features 210A-10B act as reference objects that appear the image frames being processed and from which an amount of displacement of the image frames due to camera jitter can be determined. The static features 210A-10B are understood to be stationary throughout at least the portion of the video capture event in which normalization of spatial jitter is performed as described in the present disclosure. Examples of the static features may be goal posts on a sports field, a corner of a building, a stationary logo, etc. There may be more than one static feature designated in the scene. However, each static feature should be distinguishable (e.g., by a computing device using edge and pattern detection) from image frame to image frame; e.g., an occurrence of the static feature should not appear more than once in a given image frame.

The static features 210A-10B may be comprised of a distinct set of un-occluded pixel elements. In an embodiment with a single static feature in both image frames 102A-02B of FIG. 1, such as the static feature 110, the image frames 102A-02 can be aligned in the X-Y directions (in a Cartesian coordinate system). In implementations, the image frames are aligned by, for each pixel in one of the pair of image frames, determining the corresponding pixel to be the pixel located it in the other of the pair of image frames at the position offset by of an amount of displacement (Δx, Δy) of an occurrence of the static feature in one image frame from an occurrence of the static feature in the other image frame. That is, the pixel in the second frame that corresponds to a pixel in a first frame located at (12, 34) may be located in the second frame at (12+Δx, 34+Δy). In some implementations, the image frames may be aligned in this manner.

Note, however, that multiple distinct static features within each image frame may allow for more accurate alignment of the image frames. For example, in an embodiment with two static features in both image frames 102A-02B, a centre of rotation of the displacement between the image frames 102A-02B can be calculated, and rotation jitter can be offset/neutralized in aligning the image frames 102A-02B. In such an embodiment, the image frames may be aligned by determining an amount of rotation based on the displacements of both features in one image frame from the same features in the other image frame, and then determining where each pixel has shifted and/or rotated to in one of the image frames according to the amount of displacement and/or amount of rotation. In an embodiment where three static features can be detected in both images, the instant centre of rotation may be determined. In an embodiment with four static features, the complete perspective transform may be determined using quad to quad mapping; that is, four static features may allow a full matrix of coordinate transform, including perspective transform. In the embodiment, the displacement of four static features are be used to compute the displacement of the image frames 102A-02B in two and a half dimensions (2.5D) using a perspective transform.

In an embodiment with three static features, rotation and directional shift between the image frame 102A-02B can be detected and neutralized during alignment. In an embodiment with four static features, other types of distortions may be detected and neutralized. Moreover, it is contemplated that multiple static features may be designated in a given scene being recorded to mitigate against the event where a particular static feature is not detectable or visible, such as if a primary static feature (e.g., the static feature 210) is temporarily obscured by some object in the scene, the system of the present disclosure may fall back to rely on a secondary static feature, such as the static feature 210B. Similarly, in the event that the spatial jitter, weather conditions, or lighting conditions cause blurring of the static feature such that it cannot be reliably detected, having multiple static features allow the present system to fall back to one of the secondary static features in order to align the image frames 102A-02B.

Figure 3:
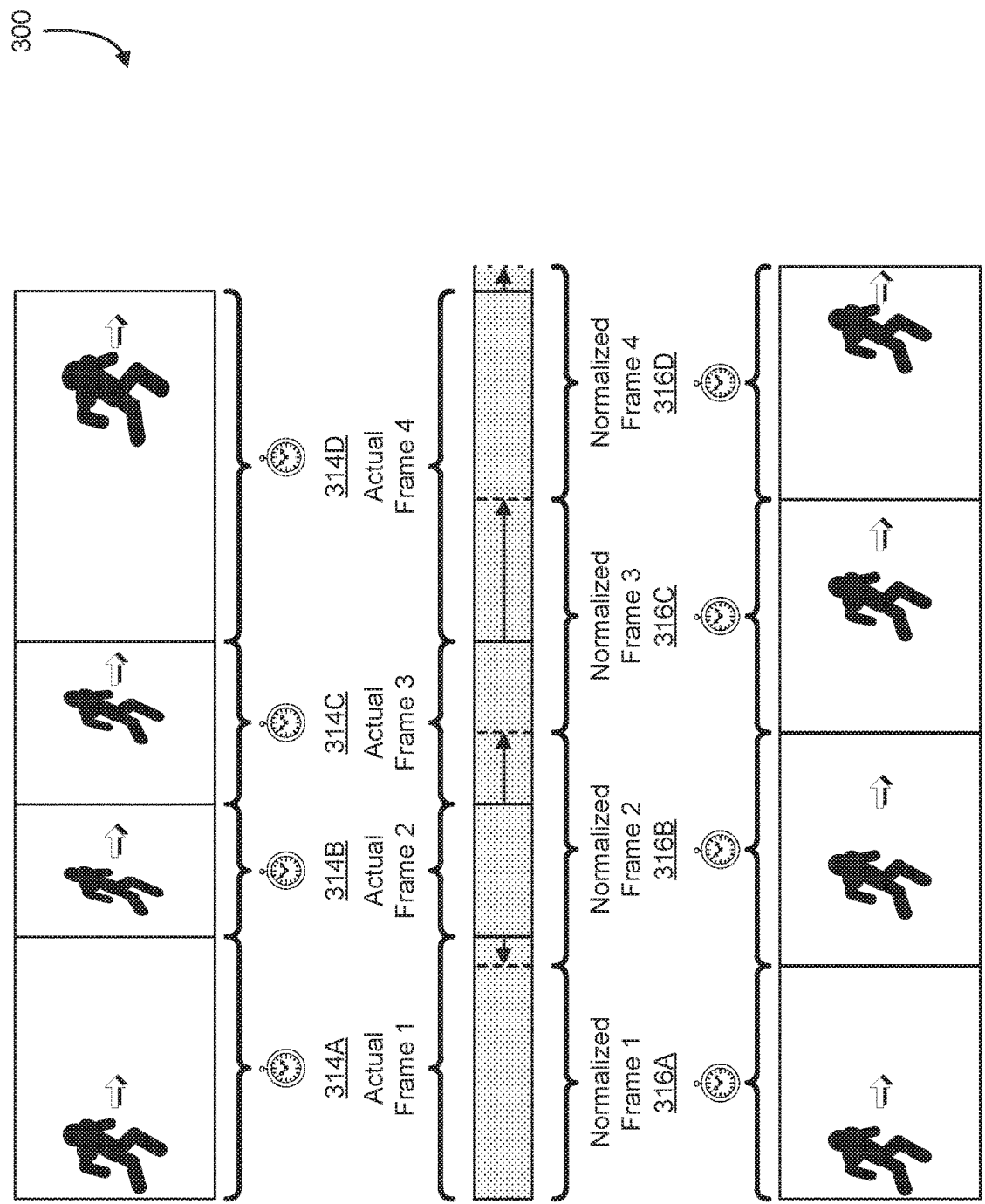
FIG. 3 illustrates an example of reducing temporal jitter in accordance with an embodiment.

FIG. 3 illustrates an example 300 of normalization of temporal jitter of an embodiment of the present disclosure. Specifically, FIG. 3 depicts image capture times of a contiguous sequence of image frames from a video capture event recorded by a video capture device, such as the video capture device 112 of FIG. 1. In the example 300, actual frame times 314A-14-D are compared to target frame times 316A-16D to illustrate how a target frame time and an actual frame time may be used to derive a value to normalize temporal jitter in a sequence of image frames captured during the image capture event.

A video capture device, such as the video capture device 112 may record a scene of a video capture event as a consecutive sequence of still images. Objects in motion captured in the images may be perceived to be in motion if viewed by a human eye at a rate higher than 5 images per second. A video capture device, such as the video capture device 112, may have an advertised frame capture rate expressed in frames per second (fps) (e.g., 25 fps, 30 fps, etc.) or frame frequency expressed in hertz (hz).

However, the actual frame rate may be more, less, or may vary from image frame to image frame. Likewise, because each image frame of the sequence of image frames is separately digitized and recorded to media, the time interval between each recorded image frame may vary. For example, at 30 fps, each frame ideally would be 33⅓ milliseconds (ms) apart. However, in actuality, some of the frames may be recorded in under 33⅓ ms, whereas other frames may take longer than 33⅓ ms to record. In some examples, this variance in frame capture time per individual frame is referred to as "temporal jitter." Temporal jitter may be caused by various factors, such as operating temperature of a component of the recording device, mechanics and dynamics of the recording device, and so on. For example, for an image capture device, such as the video capture device 112 of FIG. 1, each image may need to be digitized, filtered, compressed, and recorded onto media, and if the image requires more or less processing, available media space is fragmented, or if some glitch (or lack thereof) occurs, recording an individual image frame may take more or less time than another frame.

The effect of the variance of individual image frames may be that the pixel difference calculation between successive images, such as the distance 108 of FIG. 1, may be skewed. For example, if the capture time between two frames is longer than expected, the differences between successive images may be more pronounced, resulting in an overestimation of the motion of objects in the frame. Likewise, if the capture time interval between two frames is shorter than expected, the differences between successive images may be less pronounced, resulting in an underestimation of the motion of objects within the frame.

Thus, the actual frame times 314A-14D may be inconsistent from frame to frame. As illustrated in the example 300, the actual frame time 314A is longer than the succeeding actual frame time 314B and the actual frame time 314C. The actual frame time 314B is shorter than any of the actual frame times 314A, 314C, and 314D. Consequently, because the actual frame time 314B is shorter than average, the distance (e.g., distance 108 of FIG. 1) between pixels (in color space and/or spatially) of an image frame captured during the actual frame time 314D and pixels in a preceding or succeeding image frame in the sequence may be underweighted in proportion to other distance calculations for the sequence of image frames. Likewise, the actual frame time 314D is longer than any of the actual frame times 314A-14C. Consequently, because the actual frame time 314D is longer than average, the distance (e.g., distance 108 of FIG. 1) between pixels (in color space and/or spatially) of an image frame captured during the actual frame time 314D and pixels in a preceding or succeeding image frame in the sequence may be weighted too heavily in proportion to other distance calculations for the sequence of image frames.

To compensate, a target frame time may be determined. For example, the target frame times 316A-16D may reflect a model frame interval between each image frame of the sequence of image frames. In some embodiments, the target frame times 316A-16D may be based on the specified frame rate of the video capture device. For example, for a video capture device specified to have a frame rate of 25 fps, the target frame times may each be 40 ms. In other embodiments, the target frame times 316A-16D may be an average frame time of the sequence of image frames captured by the video capture device. For example, if the video capture device is specified to have a frame rate of 25 fps, but the frame rate for a recorded sequence of image frames actually turns out to be 24 fps, the target frame times 316A-16D may be 41.67 ms. However, in some embodiments, the target frame times 316A-16D may be a specified uniform amount of time, not necessarily related to a frame rate of the video capture device or average frame rate of the sequence of image frames.

Thus, based at least in part on a target frame time ($\Delta t_{norm}$) and the actual frame time ($\Delta t_i$) for a given frame i, a temporal correction factor ($r_t$) may be calculated as follows:

$$r_t = \frac{\Delta t_{norm}}{\Delta t_i}$$

Thus, the temporal correction factor may be a ratio of the target interval of time for recording of two images (the target frame time) to the actual interval of time of recording the two images (the actual frame time). In an illustrative example, the target frame times 316A-16D are set to 40 ms, yet the actual frame time 314A of frame 1 is 45 ms, the actual frame time 314B is 25 ms, the actual frame time 314C is 35 ms, and the actual frame time 314D is 5 ms. In that example, the temporal correction factor $r_t$ for frame 1 is ~0.89 (40÷45) and the temporal correction factor $r_t$ for frame 4 is ~0.8 (40÷50). On the other hand, for frame 2, the temporal correction factor $r_t$ is ~1.6 (40÷25) and for frame 3, the temporal correction factor $r_t$ is ~1.14 (40÷35). This temporal correction factor $r_t$ may be utilized to reduce the temporal jitter of a distance calculation (e.g., the distance 108 of FIG. 1) by reducing or increasing the spatial difference between two frames ($\Delta x$), as described in relation to FIG. 1, by the factor of the temporal correction factor $r_t$, such as according to the formula:

$$\Delta x_{norm} = \frac{\Delta x}{r_t}$$

Where $\Delta x_{norm}$ refers the distance between a pair of frames that has been normalized to reduce temporal jitter. In this manner, the "noise" introduced by uneven timing between frames may be normalized.

Figure 4:
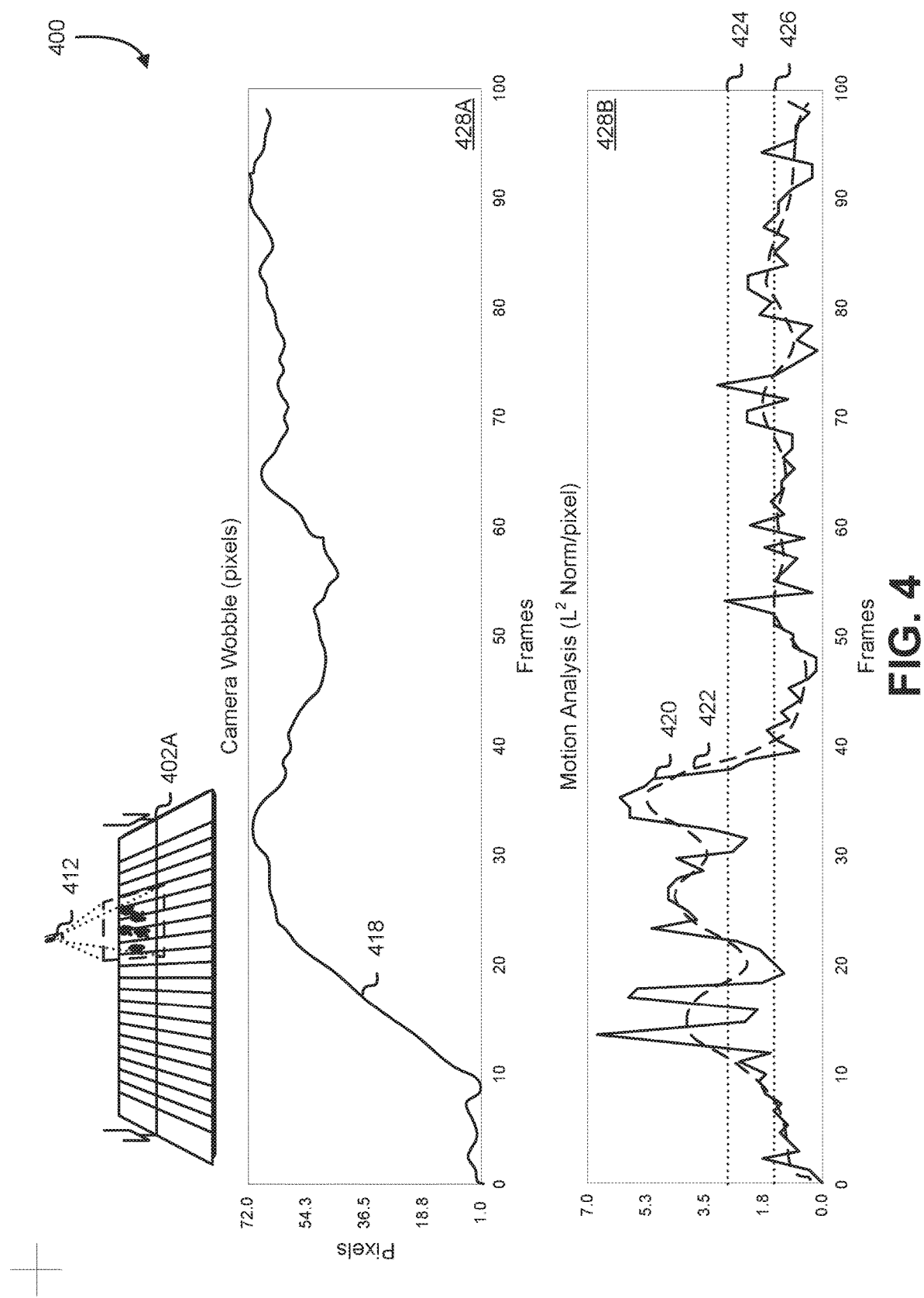
FIG. 4 illustrates an example of camera wobble and motion analysis in accordance with an embodiment.

FIG. 4 illustrates an example 400 an embodiment of the present disclosure. Specifically, FIG. 4 depicts a first graph 428A of an amount of camera wobble 418 for each frame of a contiguous sequence of 100 frames of a scene 402 recorded by a device 412 such as the video capture device 112 of FIG. 1. FIG. 4 further depicts a second graph 428B illustrating motion analysis 420 before spatial and temporal jitter have been reduced, and normalized motion analysis 422 after reduction of spatial and temporal jitter.

The scene 402 may be any scene recorded in a sequence of image frames. In the example 400, the scene 402 is illustrated to be a recording of at least a portion of a sporting event. However, it is contemplated that the techniques of the present disclosure may be applied to various other types of events (e.g., property surveillance, traffic accident monitoring, etc.). As noted, the device 412 may be a video capture device similar to the video capture device 112 described in conjunction with FIG. 1.

The graphs 428A-28B may be graphs reflecting the motion and jitter captured during the image capture event. For example, the first graph 428A may be a graph reflecting a pixel displacement between image frames caused by camera jitter (wobble). In some embodiments, the amount of camera jitter may be a Manhattan distance (also known as a taxicab distance) of the displacement; e.g., a sum of the absolute horizontal and vertical differences $\|\Delta x\|+\|\Delta y\|$ (i.e., $\|x_i-x_{i-1}\|+\|y_i-y_{i-1}\|$, where $(x_i, y_i)$ represents a position of the pixel in a first image frame and $(x_{i-1}, y_{i-1})$ represents a position of the pixel in a second image frame). Likewise, the second graph 428B may be a graph reflecting the movement of corresponding pixels between frames before and after temporal jitter has been reduced.

The camera wobble 418 may reflect an amount of displacement (e.g., in pixels) of a static feature, such as the static feature 110 in FIG. 1, in an image frame relative to an initial position of the static feature in another image frame. For example, a first image frame (e.g., frame 0) may be designated as the baseline image for an anchor location of the static feature. For each successive image frame, the static feature in the successive image frame may be aligned with the static feature. As can be seen in the example 400, frame 0, being the baseline image, has a wobble of 0 pixels. However, over time, the video capture device appears to drift, such that the static feature around frame 90 is displaced by 72.0 pixels from the anchor location of the static feature in the baseline image. By aligning the static features in the frames of the sequence of image capture frames, this drift (camera wobble) may be removed (normalized). The difference frames between each image frame and/or pixel distances may then be calculated for the common regions of the frames in the manner described in conjunction with FIG. 1. Although the graph 428 illustrates an implementation where the first image frame (frame 0) is the baseline image, it is contemplated that the baseline image may be designated from any image frame in the sequence.

The motion analysis 420 may be an amount reflecting the distances (e.g., L1-norm, L2-norm, etc.) between pixels in each adjacent pair of image frames in the sequence of image frames. For example, the amount of motion may be derived from the values in the difference frame that was determine from the difference in the common regions of two adjacent image frames, such as described above in conjunction with FIG. 1. For example, as illustrated in the example 400, because the amount of a difference between corresponding pixels in a shared region of a pair of image frames may be indicative of objects in motion during that frame interval, the motion analysis 420 may reflect a level of motion between those two frames. In some embodiments, the motion between two frames can be expressed with a formula such as:

$$\text{Motion between two frames} = \frac{1}{N}\sum (P_i - P_{i-1})^2$$

Where $P_i$ and $P_{i-1}$ refer to the pixels of the current frame i and the preceding frame, N is the number of pixels. In some embodiments, the motion analysis 420 is performed after compensating for spatial jitter as described in conjunction with FIG. 1. However, the motion analysis 420 may experience spikes and dips in motion that may be at least partially attributed to spatial jitter (as described in relation to FIG. 1) and/or temporal jitter (as described in relation to FIG. 3).

The normalized motion analysis 422 may reflect the motion analysis 420 after both spatial and temporal jitter have been reduced/normalized in a manner described in the present disclosure. For example, as can be seen, the motion analysis 420 between frames 10 and 20 appears to spike up and down rapidly. However, after reduction of the temporal jitter, the normalized motion analysis 422 shows that there was a steadier level of activity during this time period, indicating that much of the upward spikes in the motion analysis 420 may have been attributed to a longer duration between frames, whereas the downward spikes in the motion analysis 420 may have been attributed to a shorter duration between frames. However, once the motion analysis 420 is multiplied (or divided) by a temporal correction factor (e.g., $r_t$ described above), the motion reflected by the normalized motion analysis 422 may be more accurate relative to the actual motion of objects recorded during the image capture event.

The high threshold 424 usable for determining, based on a point in the normalized motion analysis 422 reaching a value relative to the high threshold 424 (e.g., exceeding, meeting or exceeding, etc.), that the amount of activity in the recorded scene is high. For example, if the sequence of image frames are a recording of a sporting event, the image frames corresponding to the points in the normalized motion analysis 422 that are above the high threshold 424, such as between frames 10-40, may be capturing an active moment during the sporting event (e.g., a football play being run). Conversely, the low threshold 426 may be usable for determining, based on a point in the normalized motion analysis 422 reaching a value relative to the low threshold 426 (e.g., falling below, falling at or below, etc.), that the amount of activity in the recorded scene is low.

Using the example of the image frames corresponding to a sporting event, the image frames corresponding to the points in the normalized motion analysis 422 below the low threshold 426 (e.g., frames 40-100) may be capturing a period of relatively low activity after a sports play. The range between the low threshold 426 and the high threshold 424 may be indicative of a moderate amount of activity relative to the overall activity of the sequence. Various operations may be implemented depending on the normalized motion analysis 422 (measure of the amount of activity) reaching a value relative to a threshold. For example, the high threshold 424 and low threshold 426 may be utilized in a filter that eliminates/skips playback or analysis of portions of the sequence of image frames that have little activity. For example, although the background of the scene may contribute to the overall motion calculation between image frames, this spatial "noise" (e.g., frames 40-100) can be filtered out using the low threshold 426. Likewise, the high threshold 424 may be utilized in a filter to bring focus to portions of the sequence of image frames having high activity (e.g., players running around the field). In an implementation, techniques of the present disclosure are usable in a video player such that clicking on an interface object or clicking a button causes the playback to skip to the next set of image frames having high activity, and in this manner skipping portions of the video recording that are tedious or uninteresting. As another example, a notification could be sent or an alarm raised if the normalized motion analysis 422 rises above the high threshold 424. As still another example, the image frames having low activity (e.g., normalized motion analysis falling below the low threshold 426) could be clipped out of the sequence of image frames.

In some implementations, the low threshold 426 and/or the high threshold 424 are to be manually designated, whereas in other implementations the low threshold 426 and/or the high threshold 424 are computed based at least in part on the overall normalized motion analysis 422 (e.g., the low threshold 426 may be one or more standard deviations below the mean of the normalized motion analysis 422 and the high threshold 424 may be one or more standard deviations above the mean of the normalized motion analysis 422).

Figure 5:
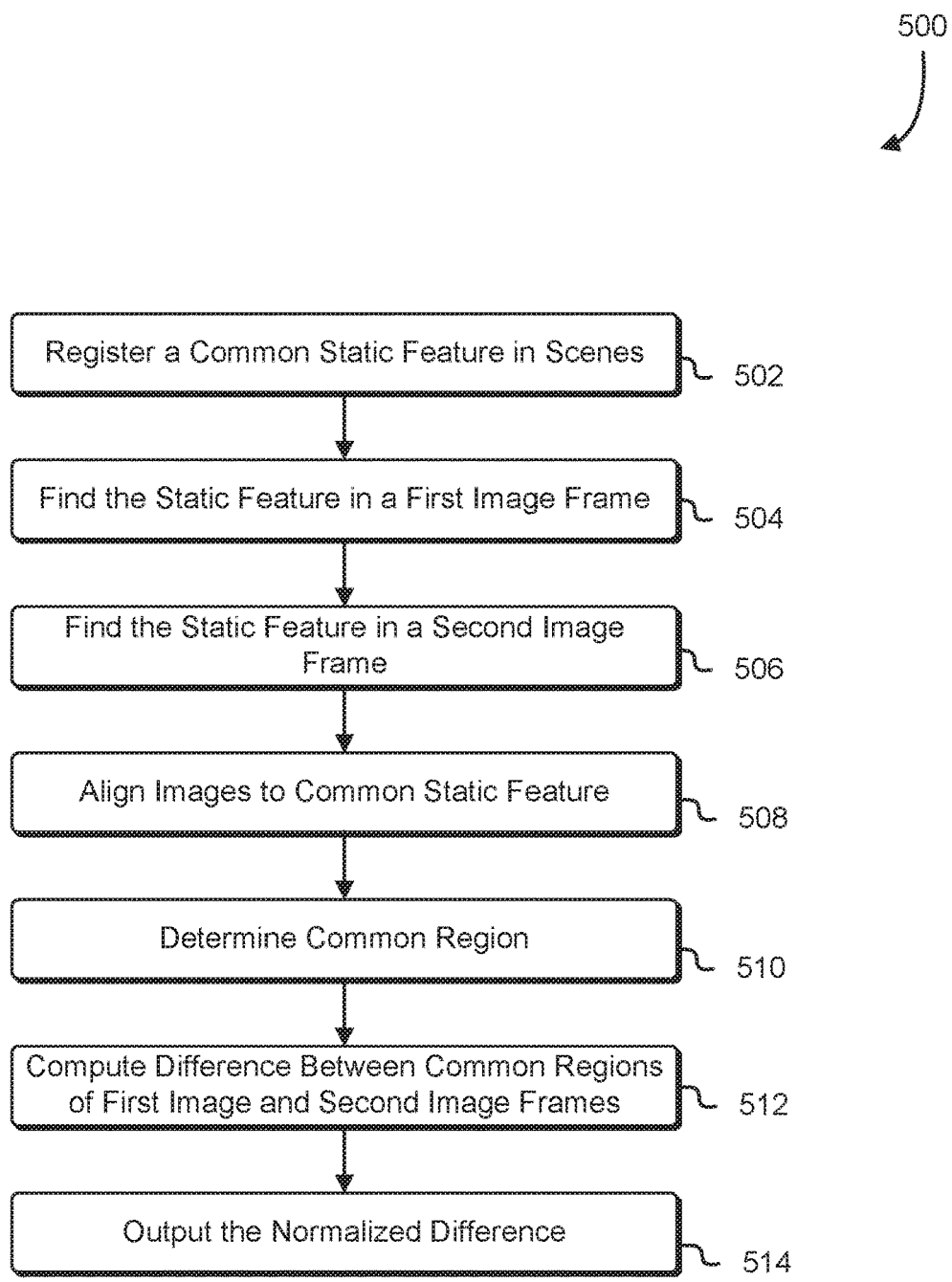
FIG. 5 is a flowchart that illustrates an example of reducing temporal jitter in accordance with an embodiment.

FIG. 5 is a flowchart illustrating an example of a process 500 for reducing spatial jitter in a contiguous sequence of image frames in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 7:
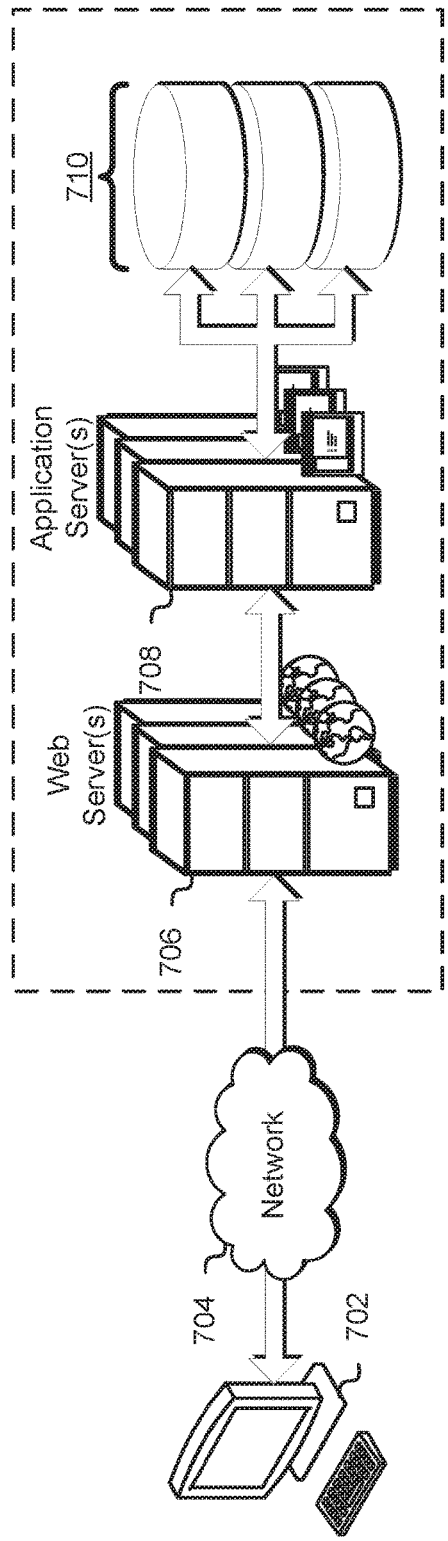
FIG. 7 illustrates an environment in which various embodiments can be implemented.

For example, some or all of process 500 may be performed by any suitable system, such as a server in a data center, by various components of the environment 700 described in conjunction with FIG. 7, such as the one or more web servers 706 or the one or more application servers 708, by multiple computing devices in a distributed system of a computing resource service provider, or by any electronic client device such as the electronic client device 702. The process 500 includes a series of operations wherein, for each of a pair of sequential image frames, a static feature common to the pair of image frames is identified, the images are aligned to the static feature to normalize spatial jitter, a common region between the pair of sequential image frames is determined, and a difference between the common regions is determined.

In 502, a static feature, such as one of the static features 210A-10B of FIG. 2, in the scene common to the sequence of image frames is designated to be a reference point to which the image frames are to be aligned. In some embodiments, the static feature may be manually specified (e.g., selected in an image by a user) in a baseline image, whereas in other embodiments the static feature may be determined by the system performing the process 500 by performing an analysis (e.g., shape analysis) of the sequence of image frames to identify a common feature in all of the image frames of the sequence. The static feature may be registered by storing the identifying characteristics (e.g., edge geometry, colors, etc.) of the region in the scene in memory of the system. In some implementations, the characteristics of a static feature are registered by storing the characteristics in a digital file or database. Occurrences of the static features in the sequence of image frames may be identified based on matching the occurrences of identifying characteristics of the static feature in the baseline image being found within individual image frames of the sequence of image frames.

In some embodiments, multiple static features may be designated and registered. Having multiple static features may provide a benefit in that, in the event that a primary static feature is temporarily obscured (e.g., by an object or weather conditions), a secondary static feature may be used as an alternative. Having multiple static features may also provide a benefit in allowing more accurate image alignment. For while, a single static feature may be used to align two images in an x-y direction, two static features may allow the assignment to compensate for rotation as well. Three static features may be used to compensate for rotation and directional shift between the two image frames.

In 504, the system performing the process 500 identifies the designated static feature in the scene in a first image frame of a pair of image frames. In embodiments, the system identifies the static feature using edge detection, corner detection, blob detection, or ridge detection. Examples of feature detectors the system may use for detecting the static feature include Canny edge detector, Sobel operator, Harris & Stephens/Plessey/Shi-Tomasi corner detection algorithms, SUSAN corner detector, level curve curvature, features from accelerated segment test (FAST), Laplacian of Gaussian (LoG), difference of Gaussians (DoG), Monge-Ampère operator, maximally stable extremal regions (MSER), principal curvature-based region detector (PCBR), and grey-level blobs.

In 506, the system performing the process 500 identifies the same static feature in the scene in a second image frame of the pair of image frames in the same manner as the static feature was identified in 504. In 508, the system determines the displacement of the static feature in the first image frame from the static feature in the second image frame. For example, if the static feature in the first image frame is located at (x, y) and the static feature in the second image frame is located at (x', y'), the displacement ($\Delta x$, $\Delta y$) may be calculated as:

$$\Delta x = x - x'$$

$$\Delta y = y - y'$$

In 510, a common region between the two image frames may be determined based on the displacement amount. As described above, the common region may be an area of the scene that is common between both the first image frame and the second image frame. Once the two images are aligned in 508, the system may determine that certain regions in one image have no analog to regions in the other image (e.g., pixels whose locations, after being adjusted by the displacement amount, would be out of bounds in the other image). These regions may be excluded, and the system may determine the remaining region to be the common region. Note that in some implementations, the common region may be different from one pair of image frames to another pair of image frames. Furthermore, in some cases the common region may be a subset of pixels in the remaining region less than the remaining region (e.g., common region need not include the entire region shared by both image frames).

The system may adjust the location of each pixel of the second image frame the displacement ($\Delta x$, $\Delta y$) amount, to align the pair of image frames. In some implementations, the system performs the operations of 504-10 between each successive pair of images in the sequence of image frames before proceeding to the operations of 512. In this manner, each of the image frames in the sequence may be aligned with the common region determined prior to computing the difference frame in 512.

In 512, the system performing the process 500 computes the difference between analogous pixels in each pair of successive image frames in the sequence of image frames. That is, in some implementations a pixel at (x, y) in a common region in a first image frame is analogous to a pixel at the same (x, y) in the common region in a second image frame that follows the first image frame. The difference value may be a difference in one or more color component values (e.g., luminance/brightness) of the two pixels. In this manner, spatial jitter caused by camera movement is normalized by the alignment of the image frames, and therefore the difference value is a spatially normalized difference. The set of difference values after calculating the difference between each of the analogous pixels in the common region of the pair of image frames may be referred to in the present disclosure as the difference frame. In some embodiments, the difference is the difference between the sum of the pixel values of the first image frame and the sum of the pixel values in the second image frame; performing the processing in this manner may reduce computation time by avoiding having to take the difference between each pair of analogous pixels.

In 514, the difference frame may be output to a file, another entity, or another process of the system. For example, each normalized difference frame may be provided to as input to the operations of 608 in process 600 of FIG. 6 in order to temporally normalize the difference frame. Additionally or alternatively, in some implementations the spatially normalized difference frames for the entire sequence of image frames is output together. For example, the normalized difference frames may be provided as input to a process to generate a graph such as the first graph 428A of FIG. 4 that displays an amount of camera wobble from a baseline. Note that one or more of the operations performed in 502-14 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 6:
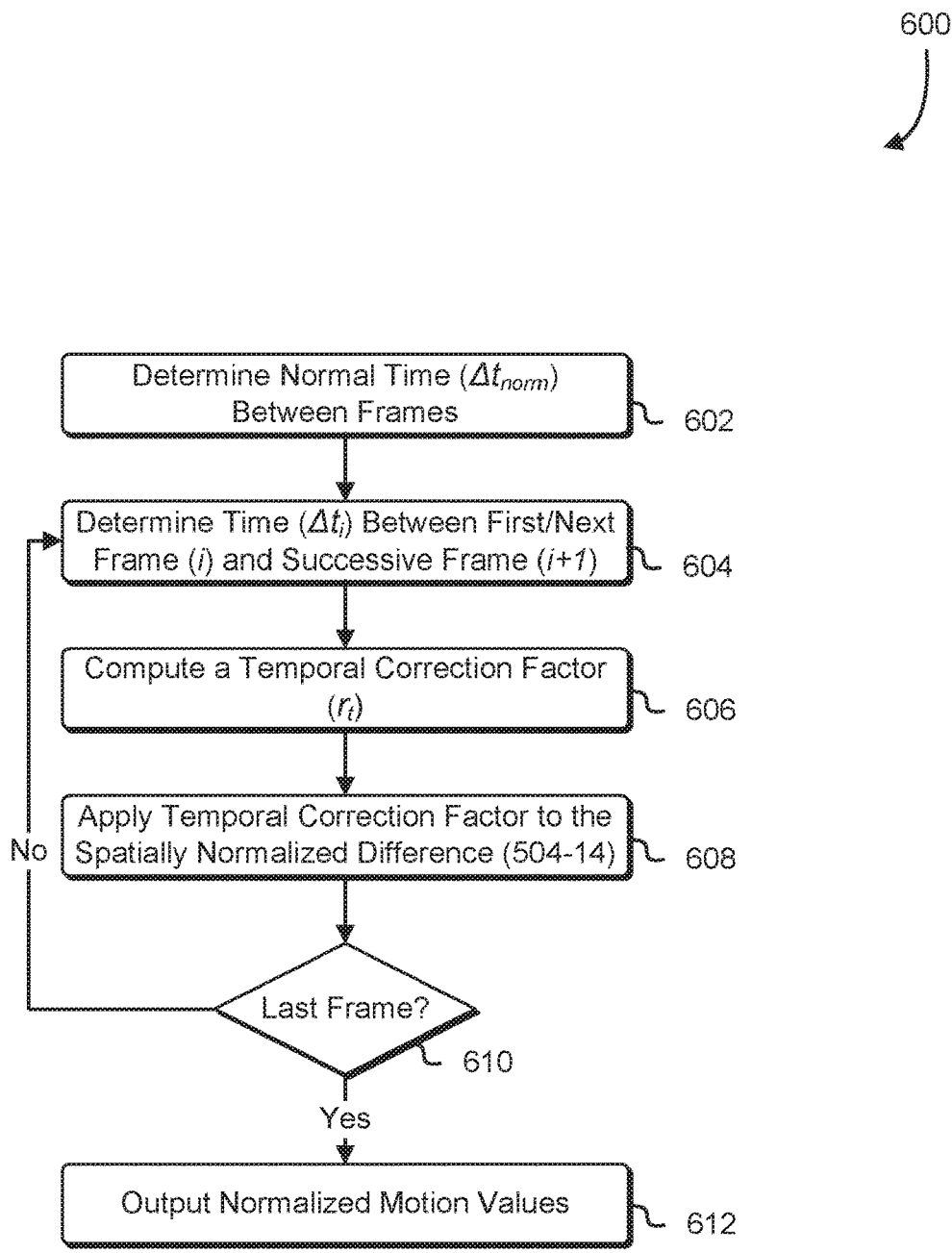
FIG. 6 is a flowchart that illustrates an example of reducing temporal jitter in accordance with an embodiment.

FIG. 6 is a flowchart illustrating an example of a process 600 for reducing temporal jitter in a contiguous sequence of image frames in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the environment 700 described in conjunction with FIG. 7, such as the one or more web servers 706 or the one or more application servers 708, by multiple computing devices in a distributed system of a computing resource service provider, or by any electronic client device such as the electronic client device 702. The process 600 includes a series of operations wherein a normal time between a pair of image frames may be determined and, for each actual time between frames, a weight value may be derived based on the normal time and the actual time. The weight value may be applied to a difference calculated between the pixels of the pair of image frames (such as the normalized difference produced in the process 500 of FIG. 5). The result may be output as a series of points representing a normalized motion analysis such as the normalized motion analysis 422 of FIG. 4.

In 602, the system performing the process 600 determines a standard duration ($\Delta t_{norm}$) to which the time between each image frame of a sequence of image frames should be normalized. In some embodiments, the standard duration may be set to the frame rate of a video capture device that recorded the sequence of image frames. In some implementations, the standard duration may be a mean or median of the time between each image frame of the sequence of image frames.

In 604, the system determines the time difference ($\Delta t_i$) between a first image frame (i) and a second image frame (i+1). In some implementations, the time difference may be determined by taking the difference between timecodes for each of the image frames.

In 606, the system performing the process 600 may compute a temporal correction factor ($r_t$). It is contemplated that various methods of computing a temporal correction factor are possible, but in some embodiments the temporal correction factor is computed by dividing $\Delta t_{norm}$ by $\Delta t_i$. In this manner, if the time difference is too short (e.g., less than $\Delta t_{norm}$), which may cause the pixel differences calculated from the process 500 of FIG. 5 to be understated, the temporal correction factor may be greater than 1. Conversely, if the time difference is too long, which may cause the pixel differences calculated from the process 500 to be overemphasized, the temporal correction factor may be less than 1.

Thus, in 608, the system performing the process 600 may normalize the temporal jitter between the pair of image frames by multiplying the pixel difference (calculated from the process 500 for the corresponding pair of image frames) by the temporal correction factor. In this manner, the pixel difference between the pair of image frames is normalized to reduce the effects of fluctuations in image capture times from image frame to image frame.

In 610, the system performing the process 600 determines whether there are image frames remaining in the sequence of image frames left to normalize. If so, the system returns to 604 and the second image frame becomes the i and the next image frame in the sequence becomes i+1. The process 604-10 may repeat until the end of the sequence of image frames is reached. If the end of the sequence of image frames is reached, the system proceeds to 612.

In 612, the system performing the process 600 outputs the normalized pixel difference values (motion values). In some embodiments, the motion values are output to a file or database. In embodiments, the motion values are input directly to, or from a file or database, another process, application, or application programming interface. For example, the motion values may be input to a process to generate a graph such as the second graph 428B of FIG. 4 to illustrate actual motion analysis 420 and/or normalized motion analysis 422 of objects in a video recording. The motion values may be used by a process for determining levels of motion of objects in a video recording. Note that one or more of the operations performed in 602-12 may be performed in various orders and combinations, including in parallel.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 700 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 7. Thus, the depiction in FIG. 7 should be taken as being illustrative in nature and not limiting to the scope of the disclosure.

The network 704 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 704 are well known and will not be discussed in detail. Communication over the network 704 can be enabled by wired or wireless connections and combinations thereof. In an embodiment, the network 704 includes the Internet and/or other publicly-addressable communications network, as the environment 700 includes one or more web servers 706 for receiving requests and serving content in response thereto, although for other networks an alternative device serving a similar purpose could be used as would be apparent to one of ordinary skill in the art.

The illustrative environment 700 includes one or more application servers 708 and data storage 710. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 708 can include any appropriate hardware, software and firmware for integrating with the data storage 710 as needed to execute aspects of one or more applications for the electronic client device 702, handling some or all of the data access and business logic for an application. The one or more application servers 708 may provide access control services in cooperation with the data storage 710 and is able to generate content including text, graphics, audio, video, and/or other content usable to be provided to the user, which may be served to the user by the one or more web servers 706 in the form of HyperText Markup Language (HTML), Extensible Markup Language (XML), JavaScript, Cascading Style Sheets (CS S), JavaScript Object Notation (JSON), and/or another appropriate client-side structured language. Content transferred to the electronic client device 702 may be processed by the electronic client device 702 to provide the content in one or more forms including forms that are perceptible to the user audibly, visually, and/or through other senses. The handling of all requests and responses, as well as the delivery of content between the electronic client device 702 and the one or more application servers 708, can be handled by the one or more web servers 706 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 710 can include several separate data tables, databases, data documents, dynamic data storage schemes, and/or other data storage mechanisms and media for storing data relating to a particular aspect of the present disclosure. For example, the data storage 710 may include mechanisms for storing various types of data and user information 716, which can be used to serve content to the electronic client device 702. The data storage 710 also is shown to include a mechanism for storing log data, such as application logs, system logs, access logs, and/or various other event logs, which can be used for reporting, analysis, or other purposes. It should be understood that there can be many other aspects that may need to be stored in the data storage 710, such as page image information and access rights information, which can be stored in any of the above listed mechanisms as appropriate or in additional mechanisms in the data storage 710. The data storage 710 is operable, through logic associated therewith, to receive instructions from the one or more application servers 708 and obtain, update, or otherwise process data in response thereto. The one or more application servers 708 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 708.

In one embodiment, a user, through a device operated by the user, can submit a search request for a match to a particular search term. In this embodiment, the data storage 710 might access the user information to verify the identity of the user and obtain information about items of that type. The information then can be returned to the user, such as in a results listing on a web page that the user is able to view via a browser on the electronic client device 702. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 704. These devices also can include virtual devices such as virtual machines, hypervisors, and other virtual devices capable of communicating via the network 704.

Various embodiments of the present disclosure utilize the network 704 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 704 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 706, the one or more web servers 706 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 700 can include a variety of data stores and other memory and storage media as discussed above. These can reside in a variety of locations, such as on a storage medium local to (and/or resident in) one or more of the computers or remote from any or all of the computers across the network 704. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    determining a target frame interval corresponding to a model duration of time between capture of a first image frame and a second image frame, the second image frame being adjacent to the first image frame in a sequence of image frames;
    determining an actual interval of time between capture of the first image frame and capture of the second image frame, the actual interval of time being different from the target frame interval;

registering a static feature common to both the first image frame and the second image frame;

identifying an occurrence of the static feature in the first image frame and another occurrence of the static feature in the second image frame;

computing, at least in part by aligning the occurrence of the static feature in the first image frame with the other occurrence of the static feature in the second image frame, a spatial distance between a first set of pixels in the first image frame and second set of pixels in the second image frame;

computing a normalized motion value based at least in part on the spatial distance, the actual interval of time, and the target frame interval; and performing an operation based at least in part on the normalized motion value reaching a value relative to a threshold.

2. The computer-implemented method of claim 1, wherein the spatial distance is a difference between one or more color space components in the first image frame and one or more color space components in the second image frame.

3. The computer-implemented method of claim 1, wherein aligning the occurrence with the other occurrence includes:

determining an amount of displacement of the static feature in the first image frame from the static feature in the second image frame; and for each pixel of the first image frame, determining a corresponding pixel in the second image frame based at least in part on the amount of displacement.

4. The computer-implemented method of claim 3, wherein:

the static feature is a first static feature;

registering the static feature includes registering a second static feature common to both the first image frame and the second image frame; and the computer-implemented method further comprises:

determining, based at least in part on the first static feature and the second static feature, an amount of rotation between the first image frame and the second image frame; and rotating the pixels of the second set of pixels in accordance with the amount of rotation.

5. The computer-implemented method of claim 3, wherein registering the static feature includes storing characteristics of a region in the sequence of image frames into memory of a computing device.

6. A system, comprising:

one or more processors; and memory including executable instructions that, if executed by the one or more processors, cause the system to:

obtain a first image and a second image;

compute a correction factor based at least in part on:

an actual interval of time between recording the first image and recording the second image; and a target interval of time that is different from said actual interval of time;

identify, based at least in part on a displacement of a reference object present in both the first image and the second image, a first region in the first image common to a second region in the second image;

compute a difference value between the first region and the second region;

normalize, based at least in part on the correction factor, the difference value to produce a normalized difference; and store the normalized difference to a data store.

7. The system of claim 6, wherein the first image and the second image are contiguous image frames in a sequence of image frames.

8. The system of claim 6, wherein executable instruction that compute the difference value further include instructions that cause the system to compute the difference value based at least in part on a displacement of the reference object between the first image and the second image.

9. The system of claim 8, wherein the executable instructions that cause the system to compute the difference value based at least in part on the displacement further include instructions that cause the system to:

not detect an occurrence of a first reference object in the first image or the second image;

identify occurrences of a second reference object in both the first image and the second image; and compute the displacement between the occurrences of the second reference object.

10. The system of claim 6, wherein:

the first image and the second image are recorded during a video capture event; and the first region and the second region correspond to a region of a scene of the video capture event that is common to both the first image and the second image.

11. The system of claim 6, wherein the executable instructions that cause the system to compute the difference value include instructions that cause the system to, for each pixel in the first region, compute a difference between a value of the pixel and a value of a corresponding pixel in the second region.

12. The system of claim 11, wherein the value of the pixel and the value of the corresponding pixel are values in a color space.

13. The system of claim 12, wherein the values in the color space are luminance values.

14. A non-transitory computer-readable storage medium having stored thereon executable instructions that, if executed by one or more processors of a computer system, cause the computer system to at least:

determine a target interval of time between recording of a first image and recording a second image;

determine an actual interval of time between recording the first image and recording the second image, the actual interval of time being different from the target interval of time;

identify, based at least in part on a displacement of a static feature common to both the first image and the second image, a first region in the first image common to a second region in the second image;

compute a difference between the first region and the second region;

normalize, based at least in part on the target interval and the actual interval, the difference to produce a normalized difference; and store the normalized difference to a data store.

15. The non-transitory computer-readable storage medium of claim 14, wherein the executable instructions further include instructions that cause the computer system to perform an operation based at least in part on a determination that the normalized difference has reached a value relative to a threshold.

16. The non-transitory computer-readable storage medium of claim 14, wherein the executable instructions that identify the first region common to a second region include instructions that cause the computer system to identify, in the first image and the second image, regions of pixels that represent a same portion of a scene in common between both the first image and the second image.

17. The non-transitory computer-readable storage medium of claim 14, wherein the second image is adjacent in time of capture to the first image in a set of images.

18. The non-transitory computer-readable storage medium of claim 14, wherein the target interval in time is based at least in part on a specified frame rate of an image capture device that recorded the first image and the second image.

19. The non-transitory computer-readable storage medium of claim 14, wherein the executable instructions further include instructions that cause the computer system to:

receive a selection of the static feature in a baseline image; and identify, based at least in part on finding a match in the first image and the second image to characteristics of the static feature in the baseline image, occurrences of the static feature in the first image and the second image.

20. The non-transitory computer-readable storage medium of claim 14, wherein:

the static feature is a member of a plurality of static features; and the executable instructions that cause the computer system to identify the first region common to the second region include instructions that cause the computer system to compute the displacement based at least in part on a perspective transform using the plurality of static features.

* * * * *